Aug. 26, 1958 P. S. BALDWIN 2,848,875
AUXILIARY CYLINDER BOOSTER
Filed May 21, 1951 2 Sheets-Sheet 1
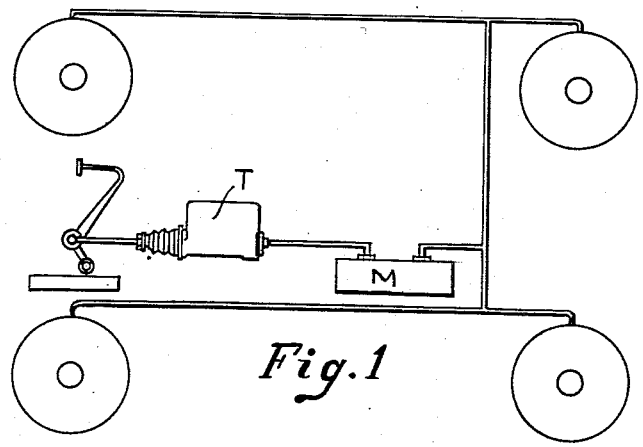
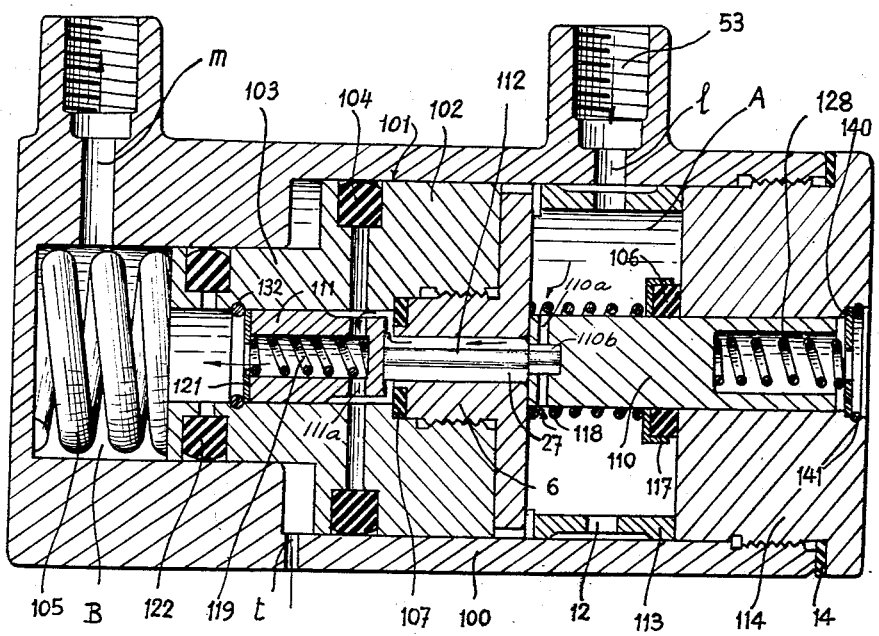
INVENTOR
PHILIP S. BALDWIN
BY
ATTORNEY Aug. 26, 1958 P. S. BALDWIN 2,848,875
AUXILIARY CYLINDER BOOSTER
Filed May 21, 1951 2 Sheets-Sheet 2

INVENTOR
PHILIP S. BALDWIN

BY

ATTORNEY

United States Patent Office 2,848,875
Patented Aug. 26, 1958

2,848,875

AUXILIARY CYLINDER BOOSTER

Philip Sidney Baldwin, Florence, Italy, assignor of one-half to Fiat Società per Azioni, Turin, Italy Application May 21, 1951, Serial No. 227,424

Claims priority, application Italy June 3, 1950

11 Claims. (Cl. 60—54.5)

The invention relates to hydraulic pressure transmission systems, more particularly to hydraulic brake systems in which the working pressure to the brake motor cylinders, which may be termed the secondary circuit, is increased with respect to the unit pressure from the master cylinder, which may be termed the primary circuit.

The principal object of the invention is to increase the pressure in the secondary circuit with respect to that of the primary circuit, gradually and progressively without any sudden jump with the rise in unit pressure.

Another object is to provide an auxiliary cylinder with vented compound piston operable therein which works as a unit in same, the auxiliary cylinder being adapted to be mounted at any given point in the hydraulic circuit between the master cylinder and motor cylinders.

Other objects will become apparent in the following specification of the invention.

Fig. 1 shows a diagram of the arrangement with the auxiliary cylinder shown, for illustrative purposes, in the hydraulic circuit between the master cylinder and the wheel cylinders.

Fig. 3 is a longitudinal sectional view of an auxiliary cylinder of the present invention, in which a conventional vented compound piston unit is used in place of the special compound piston of Fig. 2.

Figure 2:
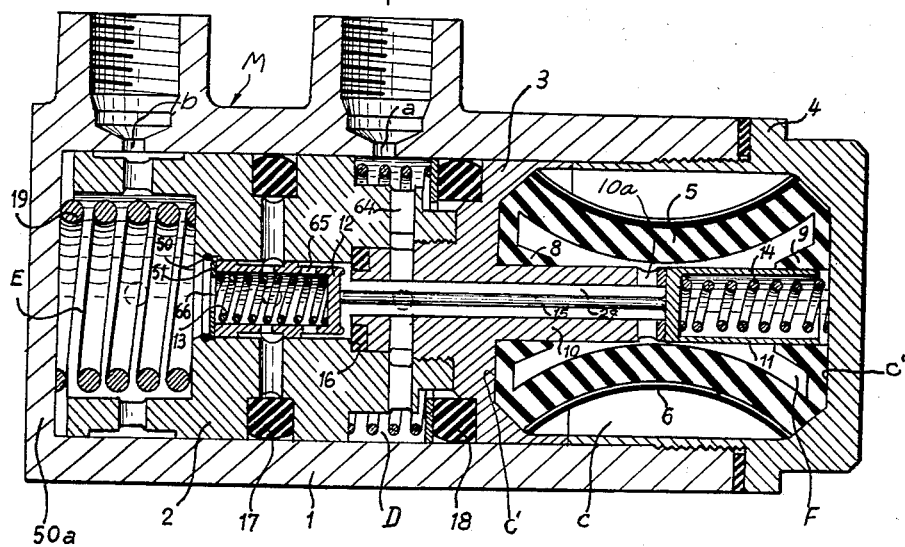
Fig. 2 is a longitudinal sectional view of an auxiliary cylinder of the present invention, in which radial pressure in the cylinder is transmitted as axial pressure through the piston.

In Figure 1 the auxiliary cylinder booster M is inserted in an ordinary brake circuit between the master cylinder T and brake motor cylinders.

As shown in Fig. 2, an auxiliary cylinder 1 of uniform bore, with inlet port $a$ and outlet port $b$, is designed to be interposed at any given point in a hydraulic pressure transmission system between the master cylinder T and brake motor cylinders. The circuit between the master cylinder and auxiliary cylinder may be termed the primary circuit, and that between the auxiliary cylinder and brake motor cylinders, the secondary circuit.

A compound piston combination of the type disclosed in my Patent No. 2,617,260 is arranged in the cylinder 1. Said piston comprises essentially a vented base part 2, a metal cupped part 3 screwed into the base part and forming a unit with it as shown, and a cupped head 4 in axial juxtaposition to the cupped part 3, and screwed into the cylinder to form a fluid-tight end plug for same. Parts 3 and 4 between them form a cylindrical chamber C as shown.

Between parts 2 and 3, adjacent port $a$, is an annular chamber D communicating with the primary circuit, and between the cylinder base and piston part 2 adjacent port $b$ is a chamber E in communication with the secondary circuit.

Chamber C contains an elastic element 5 with external longitudinal concave periphery, which is sheathed by a series of curved steel leaf springs 6 disposed longitudinally about the elastic periphery with their convex surfaces facing inwards toward the centre, and their ends abutting axially against the inner opposed end faces of the chamber.

The elastic sealing lips 8 and 9 of element 5 embrace the reduced tubular extension 10 of part 3, and a cylindrical metal cup 11, respectively, corresponding in diameter to extension 10 and forming a separate shiftable projection of same.

In the base part 2 is fitted a slidable vented metal valve cup 12 opposed to cup 11 and connected to it by a freely mounted flanged push rod 15 slidable in the bore of part 3.

In cups 11 and 12 are fitted reaction springs 14 and 13 respectively, the former being considerably stiffer than the latter, so that cup 12 is normally held shifted to the left by the thrust of push rod 15 under action of spring 14 contained in cup 11. An elastic sealing ring 16 disposed between parts 2 and 3 provides a seal against the return flow from chamber E to chamber D past the valve cup 12 under pressure, as hereinafter explained. As shown a metal washer 51 and circular spring clip 50 serves to limit outward movement of valve cup 12.

Elastic sealing rings 17 and 18 provide a seal respectively between chambers D and E, and D and C.

A very stiff reaction spring 19 fitted in chamber E bears axially against the piston base part 2, and serves to hold the piston parts 2 and 3 strongly pressed against the cupped head 4.

In operation, fluid under pressure from the master cylinder T flows freely into cylinder 1 through vent $a$ and into the chamber D and through and through the radial bores 64 in the valve body, axial bore 27, passages 65 and passage 66 in the cup-shaped member 12 and washer 51, respectively, into the chamber E. The fluid flows from chamber E to the wheel cylinder brake circuit through vent $b$, to bring the brake shoes into contact with the drums against the tension of the brake shoe return springs. At the same time fluid flows also from chamber D into chamber F through radial passage 64 and axial passage 27.

During this initial braking phase, fluid pressure on cup 11 forces it out against the pressure of spring 14, and valve cup 12 and push rod 15 are shifted to the right by spring 13 bearing on said valve cup, and the latter is seated on the sealing ring 16 to shut off the return flow from chamber E to chambers D and F, but always permitting the flow from chamber D to chamber E.

As the unit pressure increases, fluid flows through the axial bore 27 and radial ports 10a in the extension 10 into chamber C and pressure takes effect radially through the elastic walls of element 5 on the spring arcs of the curved leaf springs 6 which tend to be flattened and extended axially under pressure to exert a powerful axial thrust against the opposed end walls C′, C″ of chamber C, and force parts 3 and 2 to the left thus separating the rims of cupped parts 4 and 3.

The counteracting pressure of spring 19 on part 2 resists any axial movement of parts 3 and 2 until approximately 15 kgs. per cm.² unit pressure has been reached in chamber D when these parts will tend to be forced out to the left, and the pressure in chamber E and the secondary circuit will be gradually and progressively increased with respect to the pressure in chambers D and F and the primary circuit.

Upon release of pressure, spring 14 bearing on cup 11 and push rod 15 unseats valve cup 12 from sealing ring 16 against the counteracting pressure of spring 13, and fluid from the secondary circuit is free to flow back through the piston to the primary circuit, and release the brakes.

From the foregoing it will be seen that in the initial braking phase of the brake shoe contact stroke, until approximately 15 kgs. per cm.$^2$ unit pressure has been reached, substantially no more fluid displacement will be required than in a conventional braking system without the auxiliary cylinder, regardless of the relative size of same with respect to the master and wheel cylinders, the auxiliary cylinder merely constituting a passageway between the primary and secondary circuits.

When the unit pressure rises above 15 kgs. per cm.$^2$ to overcome the counteracting pressure of spring 19, the pressure in chamber E will rise gradually and progressively over that in chambers D and F to boost the pressure in the secondary circuit, and the piston base parts 2 and 3 will tend to be forced out to the left under the axial thrust of the curved leaf springs 6 under radial pressure to overcome the elasticity of the brake parts under the increased working pressure. The extent of the said compression stroke depending on the rigidity of the brake parts.

In view of the fact that the compound piston works as a unit, and fluid is free to flow continuously and uninterruptedly from the primary to the secondary circuit through the piston, and the compression stroke is suitably resisted by the counteracting pressure of the reaction spring 19 on the piston base, there is no sudden jump between the low pressure (under approx. 15 kgs. per cm.$^2$) contact stroke, and the high pressure compression stroke. The braking action is therefore smooth and progressive, and the driver will always feel the brake under his foot.

Fig. 3 shows an auxiliary cylinder similar to that of Fig. 2 and similarly designed to be interposed at any given point in an hydraulic pressure transmission system between the master cylinder and brake motor cylinders.

The auxiliary cylinder 100 is of two diameters or "stepped," to accommodate a vented compound piston 101 having a large head 102 and a reduced head 103 with elastic sealing rings 104 and 122. The compound piston works as a unit in the cylinder 100 and divides the cylinder into a low pressure chamber A and a high pressure chamber B.

Fluid from the master cylinder T flows into the auxiliary cylinder through vent $l$ and through the vented compound piston out to the motor cylinders through vent $m$.

A double-acting spring-loaded valve combination consisting of a vented cup piston 111 and a vented shaft member 110 freely connected by a flanged push-rod 112, permits of free, uninterrupted flow from the primary circuit to the secondary circuit through the piston and cylinder, but intercepts the return flow from the secondary circuit at a given hydraulic pressure. Flow of fluid from the low pressure chamber A to the high pressure chamber B is permitted by radial ports 110a in shaft member 110 connected to an axial cavity 110b communicating with axial bore 27 in the cylinder 101 and radial parts 111a in the cup-shaped piston 111. Elastic sealing rings 106 and 107 provide a seal for valve parts 110 and 111, respectively. Ring 106 embracing the shaft 110 which has a sliding fit in the cylinder plug 114 seals against escape of fluid along the shaft as shown. A spring 118 bearing against the piston rear face and the sealing ring thrust plate 117 keeps ring 106 pressed axially against the inner face of plug 114 as shown. Elastic ring 107, against which abuts the valve piston 111 under pressure, prevents return flow from the secondary circuit to the primary circuit as hereinafter explained. A suitable lock washer 121 and spring clip 132 serve as stops to limit outward movement of part 111 and similar parts 141 and 140, respectively, perform a similar function for part 110.

Two springs 119 and 128 are arranged in the cup-shaped members 111 and 110, respectively, and are normally compressed. Spring 128, which abuts at one end against the bottom in the cup of member 110 and at its other end against a washer 140 held in place by a clip 141, is considerably stiffer than spring 119 so that under normal conditions cup member 111 is held apart from elastic ring 107.

A very stiff reaction spring 105 bears against the reduced cylinder base at one end, and at the other end against the face of the reduced piston head 103, and serves to keep the piston normally retracted in the cylinder against the vented spacer ring 113 which abuts against the cylinder plug 114 as shown. Spring 105 is designed to resist any protractile movement (to the left) of the compound piston under pressure until approximately 15 kgs. per cm.$^2$ hydraulic pressure has been reached.

In operation, fluid under pressure from the master cylinder T flows into the cylinder 100 through vent $l$ past the vented spacer ring 113 into chamber A at the back of the large piston head, past the vented valve shaft 110, the flanged push rod 112, through the vented valve piston 111, into the reduced chamber B and out through vent $m$ to the motor cylinders, to bring the brake shoes into contact with the drums against the tension of the brake shoe return spring, in the normal manner.

During this initial brake shoe contact stroke, fluid pressure acting on the bottom of valve member 111 and on the rear part of the pressure responsive member 110, forces said member 110 against the counteracting pressure of spring 128, relieving pressure on push rod 112 to release valve piston 111 which is urged by spring 119 to seat on the elastic ring 107 to close the return flow from chamber B to chamber A, but always freely permitting flow from chamber A to chamber B until the brake shoes are brought into firm contact with the brake drums. A small breather vent $t$ through the cylinder wall serves to discharge any fluid trapped in the annular space between the leading face of the large piston head 102 and the reduced cylinder bore, as shown.

When the brake shoes are brought into solid contact with the drums, the passage of fluid into chamber B is resisted, the hydraulic pressure rises in chamber A, and the pressure takes effect on the large piston head 102. When the pressure on said head has reached a value sufficient to overcome the counteracting resistance of spring 105 (approximately 15 kgs. per cm.$^2$) a gradual progressive rise in the pressure takes place in chamber B with respect to the pressure in chamber A by virtue of the compound piston, that is to say, the pressure in the secondary circuit rises above that of the primary circuit to boost the braking pressure on the brake shoes. With the rise in pressure in chamber A, the compound piston tends to be forced to the left for the compression stroke due to the compressibility of the brake parts under the increased pressure. The extent of the said compression stroke will obviously depend on the rigidity of the brake parts.

Upon release of pressure, spring 128 bearing on shaft 110 and push rod 112 unseats valve piston 111 from sealing ring 107 against the counteracting pressure of spring 119, and fluid from the secondary circuit is free to flow to the primary circuit to release the brakes.

From the foregoing, it is obvious that the auxiliary cylinder initially merely serves as a passageway between the primary and secondary circuits, and substantially no more fluid displacement for the initial brake shoe contact stroke with the drums is required than would normally take place without the auxiliary cylinder, up to the unit pressure required to overcome the counteracting pressure of spring 105 on the compound piston (approx. 15 kgs. per cm.$^2$), and that the auxiliary cylinder may be of any size, even considerably larger than the master cylinder and wheel cylinders, without affecting the initial fluid displacement.

In view of the fact that the compound piston works as a unit and fluid is free to flow continuously and uninterruptedly from the primary to the secondary circuit through the piston, and the compression stroke is suitably resisted by the counteracting pressure of the reaction spring 105, there is no sudden jump between the low pressure (under approximatively 15 kgs. per cm.²) contact stroke and the high pressure compression stroke. The braking action is therefore smooth and progressive and the driver constantly feels the brake under his foot.

What I claim is:

1. A booster device for a hydraulic system comprising a cylinder and means for supplying fluid under pressure thereto, a low pressure chamber A adapted for connection to said source of fluid pressure, a high pressure chamber B adapted for connection to a hydraulic motor, slidable piston means 102—103 intermediate said chambers, the area of the piston exposed to pressure in the low pressure chamber being greater than that exposed to the pressure in the high pressure chamber, a fluid flow channel 27 connecting said chambers, a valve 111 slidable in said channel to control the flow through said chambers, a first pressure means 119 adjacent the high pressure chamber and acting on said valve to urge it to its closed position, a second pressure means 128 adjacent the low pressure chamber and acting on said valve to urge it to its open position, means 112 between said first and second pressure means to transmit force from one to the other, the force of said second pressure means being greater than that of said first means to normally hold said valve open; said valve having an area exposed to the pressure of fluid in said high pressure chamber and an area exposed to the pressure of fluid in said low pressure chamber, whereby upon a rise of pressure in said low pressure chamber sufficient to overcome the force of said second pressure means, the valve is caused to close without moving the piston, the continued rise of pressure in said low pressure chamber, after the closing of the valve, building up pressure on the piston to move it on a protractile stroke and increase the pressure in the high pressure chamber, said valve remaining closed during said stroke to prevent return flow from the high pressure chamber, said valve opening upon a drop in pressure in said high pressure chamber below that in the low pressure chamber to admit more fluid to the high pressure chamber.

2. In a booster device for hydraulic brake systems of the type comprising a source of fluid under pressure and a hydraulic motor, the combination of a cylinder 100 comprising a low pressure chamber A and a high pressure chamber A in said cylinder connected, respectively, with said source of fluid under pressure and with said motor; a piston 102—103 movable in said chambers and responsive to said fluid under pressure, a conduit 27 connecting said high and low pressure chambers, a valve 111 in said conduit to admit fluid under pressure from said low to said high pressure chamber, a first spring means 105 for resisting the compression stroke of the piston, a second spring means 119 for urging said valve to its closed position, a third spring means 128 spaced from said second spring means for urging said valve towards its open position, said third spring means having a force great enough to overcome the pressure of said second spring means, means 110 responsive to the fluid pressure in said low pressure chamber for disengaging said third spring means from said valve; a control member 112 between said valve and said pressure responsive means, said member being normally urged by said third spring means against the valve to hold said valve open, said pressure responsive means relieving the pressure of said third spring means and said control member from said valve when the pressure in said low pressure chamber reaches a value sufficient to overcome the resistance of said third spring means without moving said piston, whereby said second spring means closes said valve to shut off communication between said chambers before the piston begins its compression stroke, said valve being thereupon maintained closed by said second spring means and the rise of pressure in said high pressure chamber as the piston moves on a compression stroke.

3. A booster according to claim 2 in which the conduit extends through said piston.

4. A booster according to claim 2 in which said control member is a flanged bar extending through said conduit.

5. A booster according to claim 2 in which said valve is a cupped member enclosing said second spring means.

6. A booster according to claim 2 in which said pressure responsive means is a cupped member enclosing said third spring means.

7. A booster according to claim 2 in which the valve is a cupped member enclosing said second spring means at one end of said conduit, said pressure responsive means is a cupped member enclosing said third spring means at the other end of said conduit, and said control member extends between the two cupped members, transmitting the forces exerted by the respective cup members from one to the other.

8. A booster for hydraulic brake systems comprising a cylinder having a high pressure and a low pressure chamber therein, a piston movable between said chambers, a fluid flow channel in said piston and a valve in said channel controlling the flow of fluid from one chamber to the other, said valve being subject to the pressures in said chambers, a first pressure means acting on said valve to urge it to closed position, second pressure means 112—128 acting on said valve to urge it to open position, said second means having the greater force of the two and normally holding said valve open, said second means being responsive to an increase of pressure in the low pressure chamber sufficient to overcome the force of said second pressure means and relieve its pressure on said valve, whereupon said first pressure means closes said valve to shut off the flow of fluid from the high pressure chamber to the low pressure chamber, said increase of pressure being of a value less than that required to move said piston on a compression stroke.

9. A booster device according to claim 8, in which the piston comprises in part a radially and axially expansible member which expands radially upon the continued application of pressure in the low pressure chamber, after the closing of the valve, to produce an axial thrust for moving the piston axially to effect an increase of pressure in the high pressure chamber.

10. A booster according to claim 8 in which said second pressure means comprises a control member extending between said first and second pressure means to transmit force from one to the other.

11. A booster device for a hydraulic system comprising a cylinder providing a low pressure chamber and a high pressure chamber, means for supplying fluid under pressure to said low pressure chamber, means for connecting the high pressure chamber to a hydraulic motor, piston means movable in each of said chambers, means interconnecting said piston means to move together, the area of the piston means exposed to fluid pressure in the low pressure chamber being substantially constant and materially greater than the area of the piston means exposed to fluid pressure in the high pressure chamber, so that pressure in the low pressure chamber tends to move said piston means to apply a higher pressure to fluid in the high pressure chamber, a stiff compression spring in the high pressure chamber and acting on said piston means to oppose such movement, a fluid flow channel connecting said chambers for flow of fluid from said low pressure chamber to said high pressure chamber, means sealing said chambers from one another except for said channel, valve means controlling flow of fluid through said channel and comprising a valve seat surrounding said channel and a valve member in said channel movable relative to said piston and movable relative to said seat between open and closed positions, said movement of the valve member being independent of the movement of said piston means, spring means biasing said valve member toward open position and pressure-responsive control means connected with and controlling said valve member and comprising a member having an area exposed to pressure in said low pressure chamber and operable to compensate said bias upon selected pressure rise in said low pressure chamber, and a member having an area exposed to pressure in said high pressure chamber and operable to maintain said valve closed upon selected rise of pressure in said high pressure chamber.

References Cited in the file of this patent

UNITED STATES PATENTS

| | | |
|---|---|---|
| 1,569,143 | Robinson | Jan. 12, 1926 |
| 1,620,115 | MacKenzie | Mar. 8, 1927 |
| 1,970,999 | Ferris et al. | Aug. 21, 1934 |
| 2,191,716 | Hunt | Feb. 27, 1940 |
| 2,207,173 | Goepfrich | July 9, 1940 |
| 2,239,955 | Freeman | Apr. 29, 1941 |
| 2,272,360 | Swift | Feb. 10, 1942 |
| 2,381,930 | Schnell | Aug. 14, 1945 |
| 2,399,270 | Vickers | Apr. 30, 1946 |
| 2,408,513 | Gunderson | Oct. 1, 1946 |
| 2,593,192 | Rockwell | Apr. 15, 1952 |

FOREIGN PATENTS

| | | |
|---|---|---|
| 959,087 | France | Mar. 22, 1950 |
| 668,612 | Germany | Dec. 7, 1938 |